US011905889B2

United States Patent
Verdier et al.

(10) Patent No.: US 11,905,889 B2
(45) Date of Patent: Feb. 20, 2024

(54) AIRCRAFT TURBOMACHINE WITH REDUCER

(71) Applicant: SAFRAN AIRCRAFT ENGINES, Paris (FR)

(72) Inventors: Marion Jeanne Pierrette Verdier, Moissy-Cramayel (FR); Yanis Benslama, Moissy-Cramayel (FR); Michel Gilbert Roland Brault, Moissy-Cramayel (FR); Romain Guillaume Cuvillier, Moissy-Cramayel (FR); Serge René Morreale, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 312 days.

(21) Appl. No.: 17/278,617

(22) PCT Filed: Sep. 19, 2019

(86) PCT No.: PCT/FR2019/052193
§ 371 (c)(1),
(2) Date: Mar. 22, 2021

(87) PCT Pub. No.: WO2020/065182
PCT Pub. Date: Apr. 2, 2020

(65) Prior Publication Data
US 2022/0042460 A1  Feb. 10, 2022

(30) Foreign Application Priority Data
Sep. 24, 2018 (FR) ...................................... 1858673

(51) Int. Cl.
*F02C 7/36* (2006.01)
*F01D 15/12* (2006.01)
(Continued)

(52) U.S. Cl.
CPC ................ *F02C 7/36* (2013.01); *F01D 15/12* (2013.01); *F01D 5/026* (2013.01); *F01D 25/16* (2013.01);
(Continued)

(58) Field of Classification Search
CPC combination set(s) only.
See application file for complete search history.

(56) References Cited

U.S. PATENT DOCUMENTS

| 10,533,567 B2 * | 1/2020 | Juh ........................ F04D 29/044 |
| 2001/0020361 A1 * | 9/2001 | Udall .................... F01D 25/162 |
| | | 60/226.1 |

(Continued)

FOREIGN PATENT DOCUMENTS

| EP | 1090222 A1 | 4/2001 |
| EP | 1213445 A1 | 6/2002 |

(Continued)

OTHER PUBLICATIONS

International Search Report and Written Opinion received in corresponding international application No. PCT/FR2019/052193, filed Sep. 19, 2019, 10 pages.

*Primary Examiner* — Binh Q Tran
(74) *Attorney, Agent, or Firm* — Christensen O'Connor Johnson Kindness PLLC

(57) ABSTRACT

A turbomachine includes a single ducted fan including a first shaft rotated by a second shaft via a speed reduction gearset, the second shaft being rotated by a third shaft of a turbine, the first shaft being guided in rotation with respect to a fixed structure via a first bearing and a second bearing placed upstream of the speed reduction gearset. The second shaft is guided in rotation with respect to the first shaft via a rolling bearing placed upstream of the speed reduction gearset, the rolling bearing comprising an outer ring housed in the first (Continued)

shaft, an inner ring connected to the second shaft and rolling elements arranged between the inner and outer rings.

12 Claims, 7 Drawing Sheets

(51) Int. Cl.
  *F02C 3/107* (2006.01)
  *F02C 3/113* (2006.01)
  *F02C 7/06* (2006.01)
  *F02C 3/10* (2006.01)
  *F01D 5/02* (2006.01)
  *F01D 25/16* (2006.01)
(52) U.S. Cl.
  CPC ............... *F02C 3/10* (2013.01); *F02C 3/107* (2013.01); *F02C 3/113* (2013.01); *F02C 7/06* (2013.01); *F05D 2220/30* (2013.01); *F05D 2240/50* (2013.01); *F05D 2240/60* (2013.01); *F05D 2250/36* (2013.01); *F05D 2270/023* (2013.01)

(56) References Cited

U.S. PATENT DOCUMENTS

| | | | | |
|---|---|---|---|---|
| 2006/0090450 | A1* | 5/2006 | Moniz | F02K 3/072 60/226.1 |
| 2008/0022653 | A1 | 1/2008 | Schilling | |
| 2018/0023480 | A1* | 1/2018 | Lefebvre | F01D 15/12 60/792 |
| 2018/0306121 | A1* | 10/2018 | Curlier | F16H 1/203 |
| 2018/0334964 | A1* | 11/2018 | Desjardins | F02C 7/06 |
| 2019/0039454 | A1* | 2/2019 | Duong | F16D 13/24 |
| 2020/0023982 | A1* | 1/2020 | Kupratis | B60L 50/61 |
| 2020/0191055 | A1* | 6/2020 | Kubiak | F02K 3/06 |

FOREIGN PATENT DOCUMENTS

| | | |
|---|---|---|
| EP | 1921253 A2 | 5/2008 |
| EP | 3276153 A1 | 1/2018 |
| FR | 3075863 A1 | 6/2019 |
| WO | 2019122740 A1 | 6/2019 |

* cited by examiner

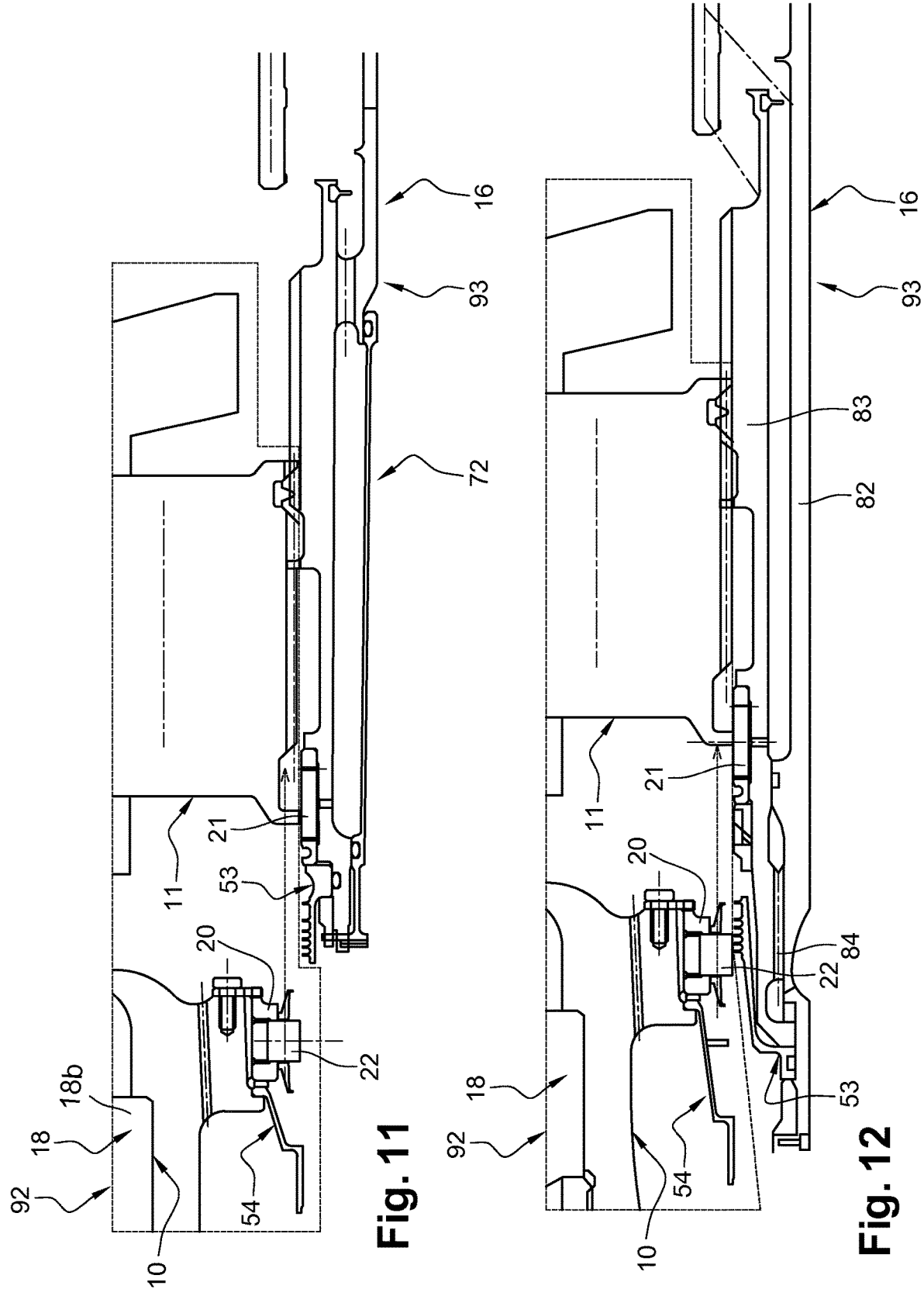

AIRCRAFT TURBOMACHINE WITH REDUCER

TECHNICAL FIELD

Embodiments of the present disclosure concern an aircraft turbomachine with reducer.

BACKGROUND

A turbomachine, such as a dual flow turbojet engine, typically comprises an air inlet comprising a ducted fan whose outlet airflow divides into an airflow that enters the engine and forms a hot flow (or primary flow), and an airflow that flows around the engine and forms a cold flow (or secondary flow).

The engine typically comprises, from upstream to downstream, in the direction of gas flow, at least one compressor, one combustion chamber, at least one turbine, and one exhaust nozzle in which the combustion gases leaving the turbine (primary flow) are mixed with the secondary flow. A turbomachine may also be of the "two-spool" type, which means that it comprises two rotors disposed coaxially. A first spool is called a low pressure spool and a second spool is called a high pressure spool. In this case, the engine is known to comprise, from upstream to downstream, a low-pressure compressor, a high-pressure compressor, the combustion chamber, a high-pressure turbine and a low-pressure turbine.

In the case of a turbomachine with reducer, the turbine shaft drives the fan shaft via a speed reducer which is lubricated and housed in an annular lubrication chamber. The reducer reduces the rotational speed of the fan shaft relative to the rotational speed of the turbine shaft.

Depending on the type of reducer used, planetary or epicyclic, the fan shaft will rotate in the same direction or in the opposite direction to the turbine shaft. A planetary or epicyclic reducer comprises at least one epicyclic gearset train each (comprising at least one sun gear, one planet carrier, planet gears and one ring gear) arranged in a defined configuration.

More precisely, an epicyclic reducer comprises a fixed ring gear and a planet carrier secured to the fan shaft, each planet gear having a mobile axis of rotation.

The turbine shaft, which is the low-pressure turbine shaft in the case of a two-spool turbomachine, is usually coupled to a low-pressure compressor shaft, which in turn is coupled to an input shaft of the reducer. This input shaft is rotationally coupled to a sun gear of the reducer in order to drive it in rotation.

The fan shaft is, for example, guided in rotation relative to a fixed structure via two bearings which are spaced apart and located upstream of the speed reducer. The input shaft is guided in rotation relative to the fixed structure via a bearing located downstream of the speed reducer.

In the case of an epicyclic reducer, the misalignments at the inner elements of the speed reducer (especially the sun gear and the planet gears) depend, among other things, on the existing misalignments between the fan shaft and the input shaft.

Such misalignments comprise the so-called "static" misalignments, which are the misalignments resulting from the functional dimensioning of the different assembled parts, the so-called "quasi-static" misalignments, which are the misalignments generated under static loading, and the so-called "dynamic" misalignments, which are the misalignments generated under dynamic loading. Although engine manufacturers try to reduce these misalignments as much as possible, the fact remains that they are unavoidable.

In order to reduce misalignments between the fan shaft and the input shaft, engine manufacturers traditionally choose to introduce elastically deformable means (e.g. at the input shaft) and/or coupling means with angular deflection (e.g. coupling means with crowned teeth, commonly known as "crowned splines") into the drive system (e.g. at the connection between the input shaft and the sun gear).

With only elastically deformable means in the transmission system, it has been found that the misalignments between the input shaft and the fan shaft generate an inhomogeneous meshing between the different inner elements of the reducer (and thus to high-frequency vibrations), which causes premature wear due to fatigue of the meshed elements.

The addition of crowned teeth coupling means in the transmission system at the connection between the input shaft and the sun gear improves the homogeneity of the meshing, but requires the coupling means to operate with a large angle of misalignment, which causes premature wear of the coupling means.

The prior art further comprises the documents EP-A2-1921253, US-A1-2008/022653, EP-A1-1090222, EP-A1-3276153 and EP-A1-1213445.

The purpose of the present invention is thus to propose a turbomachine with an optimized architecture that makes it possible to address the aforementioned disadvantages.

SUMMARY

The disclosure provides a turbomachine comprising a single ducted fan comprising a first annular shaft carrying blades and driven in rotation by a second annular shaft via a speed reducer, the second shaft being driven in rotation by a third shaft of a turbine, the first, second and third shafts having the same axis of rotation X, the first shaft being guided in rotation with respect to a fixed structure via a first bearing and a second bearing located upstream of the speed reducer, wherein the second shaft is guided in rotation with respect to the first shaft via a third rolling bearing located upstream of the speed reducer, the third rolling bearing comprising an outer ring housed in the first shaft, an inner ring attached to the second shaft and rolling elements disposed between the inner and outer rings.

The first shaft can be guided in rotation directly with respect to the fixed structure via the first bearing and the second bearing located upstream of the speed reducer.

The addition of an inter-shaft rolling bearing upstream of the speed reducer makes it possible to stiffen an upstream portion of the second shaft (input shaft), and more precisely the upstream portion of the input shaft coupled with the speed reducer. Indeed, this inter-shaft rolling bearing ensures a rotational guidance of the upstream portion of the input shaft with respect to the fixed structure which is structural via the first shaft (fan shaft) which is in turn rigid due to its guidance with respect to the fixed structure.

Thus, in general, the addition of this rolling bearing minimizes the existing misalignments between the fan shaft and the upstream portion of the input shaft. More specifically, in the case of an epicyclic reducer, this additional guidance with respect to the fixed structure makes it possible to significantly reduce the misalignments present at the connection between the input shaft and the sun gear and between the sun gear and the planet gears, since on the one hand the rigidity of the upstream portion of the shaft is increased and on the other hand the fan shaft and the planet carrier are rigid.

The turbomachine according to the disclosure may comprise one or more of the following characteristics, taken in isolation from each other or in combination with each other:

the turbomachine comprises sealing means located upstream of the third bearing and configured to ensure tightness between the first shaft and the second shaft;

the sealing means comprise a first member and a second member, the first member comprising at least one annular lip in radial contact with an abradable ring of the second member;

the first member comprises a collar attached to the second shaft, the collar being disposed axially between axial holding means and the inner ring or a ledge made in the second shaft;

the second member comprises a flange located in a housing of the first shaft between the outer ring and a shoulder made in the housing;

the second shaft is guided in rotation relative to the fixed structure via a fourth bearing;

the second shaft is rotationally coupled to the speed reducer via first coupling means, the second shaft being rotationally coupled to a fourth annular shaft of a compressor via second coupling means disposed downstream of the speed reducer, the fourth shaft being in turn rotationally coupled to the third shaft;

the second shaft comprises an inner portion and an outer portion centred on the axis X, the inner portion and the outer portion being rotationally coupled to each other via third coupling means disposed upstream of the third bearing, the outer portion being rotationally coupled to the speed reducer via the first coupling means, the inner ring being attached to the outer portion, the inner portion being rotationally coupled to the fourth shaft via the second coupling means;

the third coupling means have an angular deflection;

the second shaft comprises elastically deformable means axially disposed downstream of the speed reducer;

the elastically deformable means comprise a first elastically deformable device and a second elastically deformable device located one after the other;

the turbomachine comprises a nozzle disposed downstream of the speed reducer, the nozzle comprising an outlet for injecting a liquid lubricant into an internal cavity formed in the second shaft, the turbomachine further comprising conveying means of the lubricant configured to convey the lubricant from said cavity to the third bearing;

the first and second bearings each comprise an inner ring connected to the first shaft, an outer ring connected to the fixed structure and rolling elements between the inner and outer rings.

DESCRIPTION OF THE DRAWINGS

The disclosure will be better understood and other details, characteristics and advantages of the disclosure will appear when reading the following description made as a non-limitative example and with reference to the annexed drawings in which:

FIG. 11 illustrates an assembly step of a method for assembling the turbomachine with reference to the concrete example of the first embodiment illustrated in particular in FIGS. 3 and 4;

FIG. 12 illustrates an assembly step of a method for assembling the turbomachine with reference to the concrete examples of the second embodiment illustrated in particular in FIGS. 6 to 8;

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
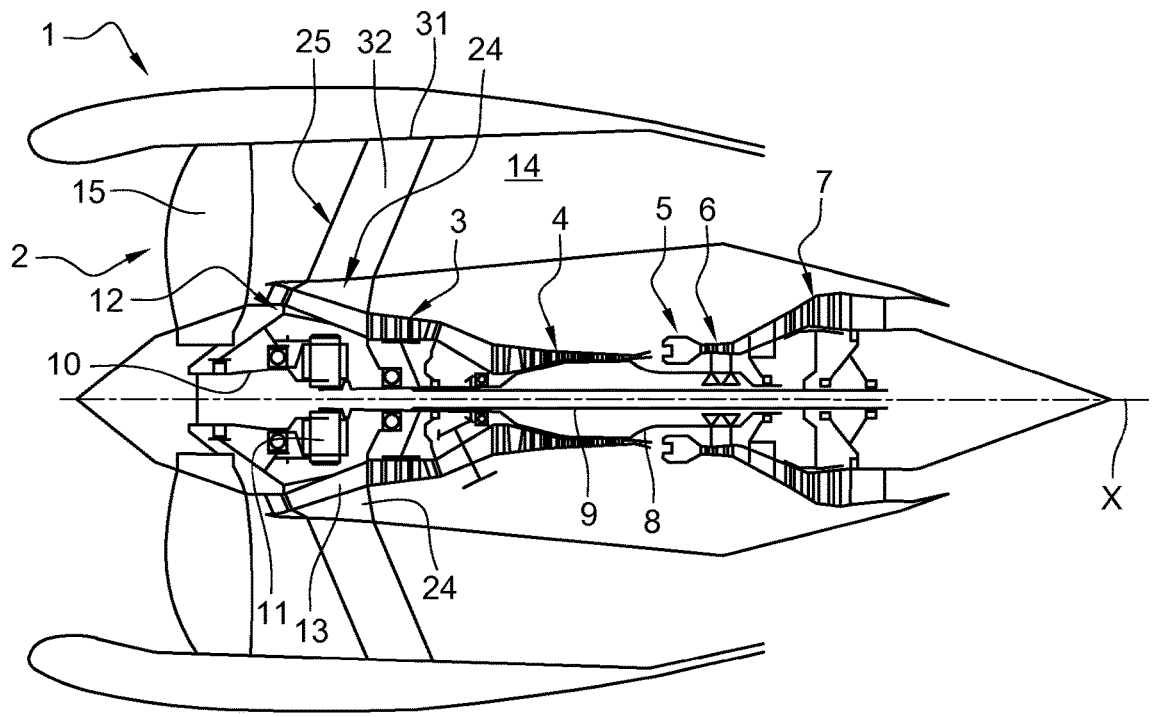
FIG. 1 is a schematic axial section view of an aircraft turbomachine with reducer according to a first embodiment.
Figure 2:
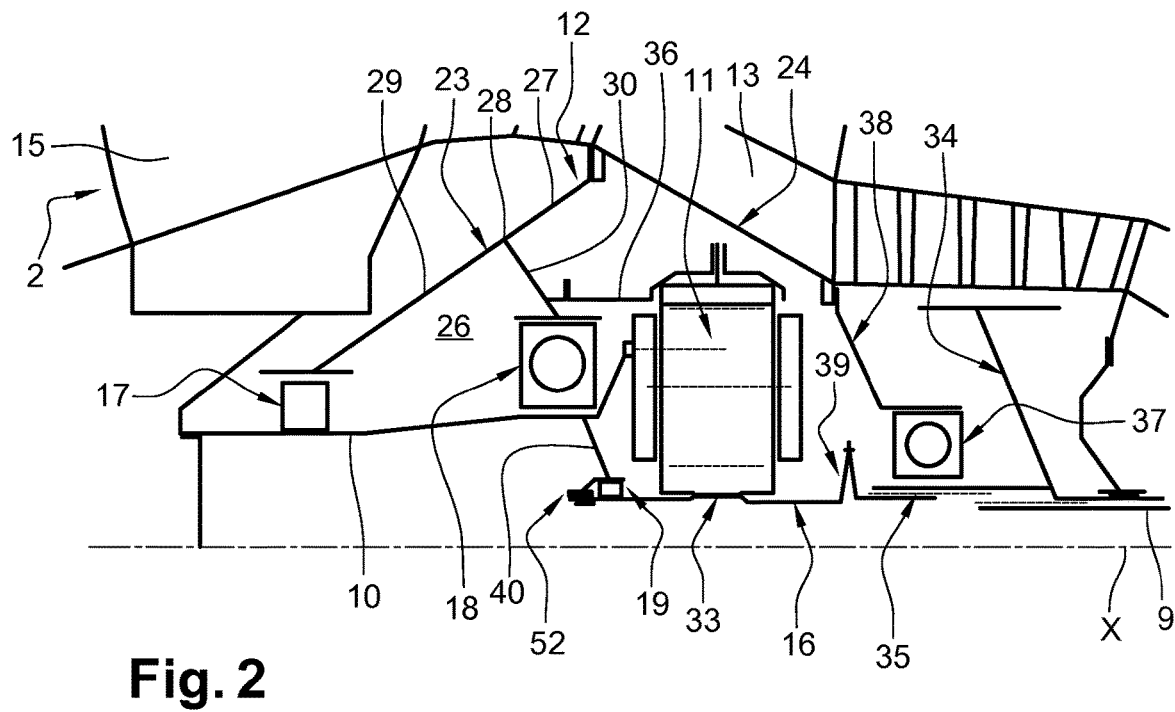
FIG. 2 is a detail view of FIG. 1.

FIG. 1 shows a turbomachine 1 with a reducer, which conventionally comprises, from upstream to downstream in the direction of gas flow, a single ducted fan 2 and an engine comprising a low-pressure compressor 3, a high-pressure compressor 4, a combustion chamber 5, a high-pressure turbine 6 and a low-pressure turbine 7. The rotors of the high-pressure compressor 4 and the high-pressure turbine 6 are connected by a high-pressure shaft 8 and form with it a high-pressure (HP) spool. The rotors of the low-pressure compressor 3 and the low-pressure turbine 7 are connected by a low-pressure shaft 9 and form with it a low-pressure (LP) spool. The shaft 10 of the fan 2 is driven by the shaft 9 of the low-pressure (LP) turbine 7 via a speed reducer 11.

The terms "upstream" and "downstream" are conventionally defined in this disclosure with respect to the direction of gas flow in the turbomachine 1. "Axial" or "axially" means any direction parallel to the axis X of the turbomachine, and "radial" or "radially" means any direction perpendicular to the axis X of the turbomachine. Similarly, by convention in this disclosure, the terms "internal" and "external", "inner" and "outer" are defined radially with respect to the axis X of the turbomachine 1, which is, inter alia, the axis of rotation of the HP and LP shafts 8, 9.

The air flow generated by the fan 2 is divided, by a flow-splitting nose of a fixed structure 12 of the turbomachine 1, into a primary air flow which enters in a primary flowpath 13 of the engine and a secondary air flow which flows around the engine in a secondary flowpath 14 and participates in a preponderant way in the thrust provided by the turbomachine 1.

The ducted fan 2 comprises an annular fan shaft 10 (first shaft) carrying blades 15 and is rotated by an annular input shaft 16 (second shaft) via a speed reducer 11. The input shaft 16 is rotated by the shaft 9 of the low-pressure turbine (LP) 7. The fan shaft 10, the input shaft 16 and the LP turbine shaft 9 have the same axis of rotation which is coaxial with the axis X of the turbomachine 1.

Figure 4:
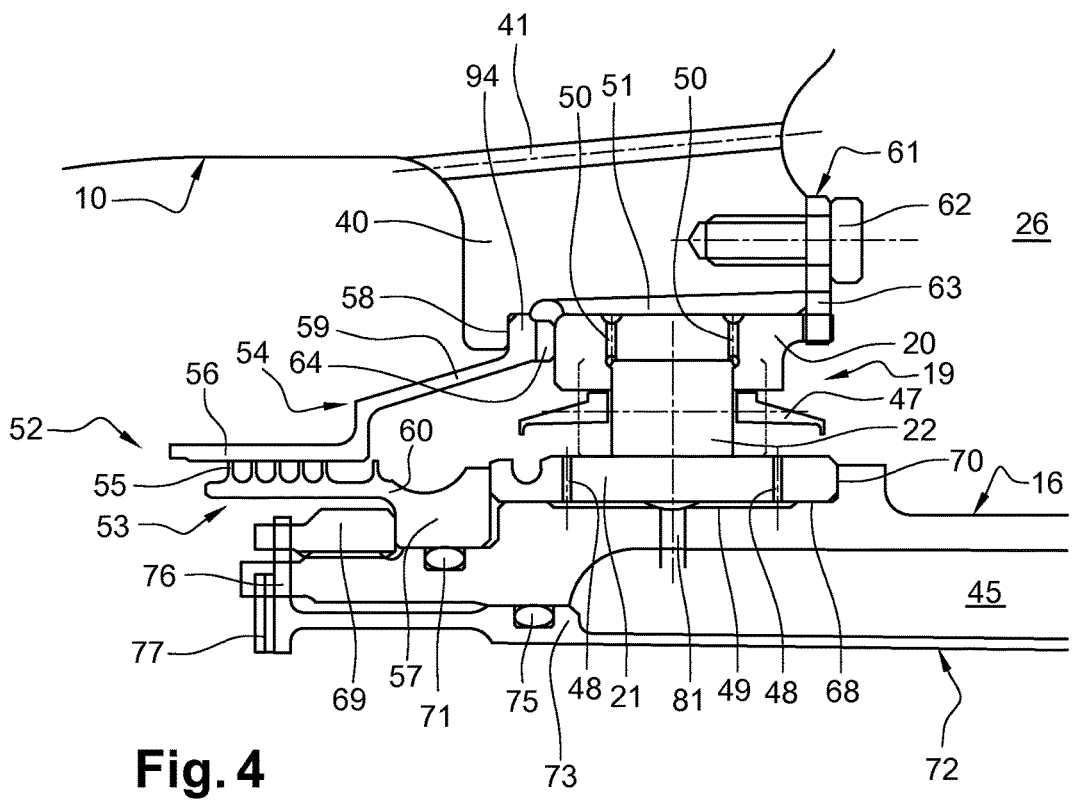
FIG. 4 is a detail view of FIG. 3.
Figure 5:
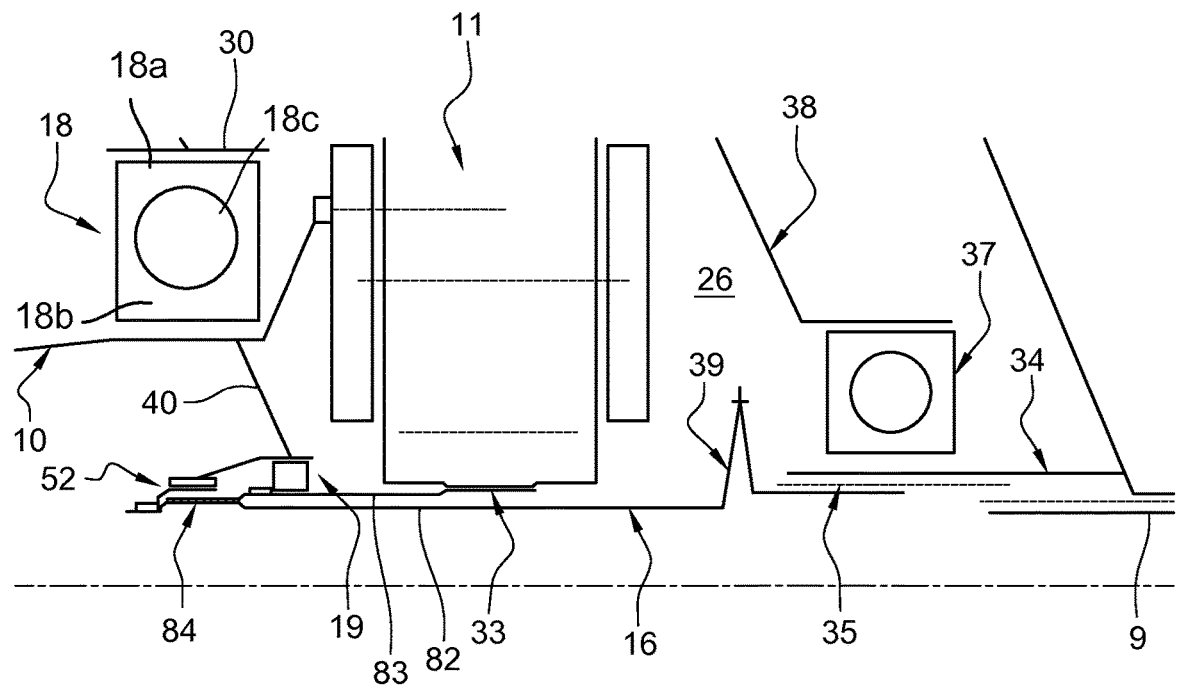
FIG. 5 is a schematic axial half-section detail view of an aircraft turbomachine with reducer according to a second embodiment.
Figure 8:
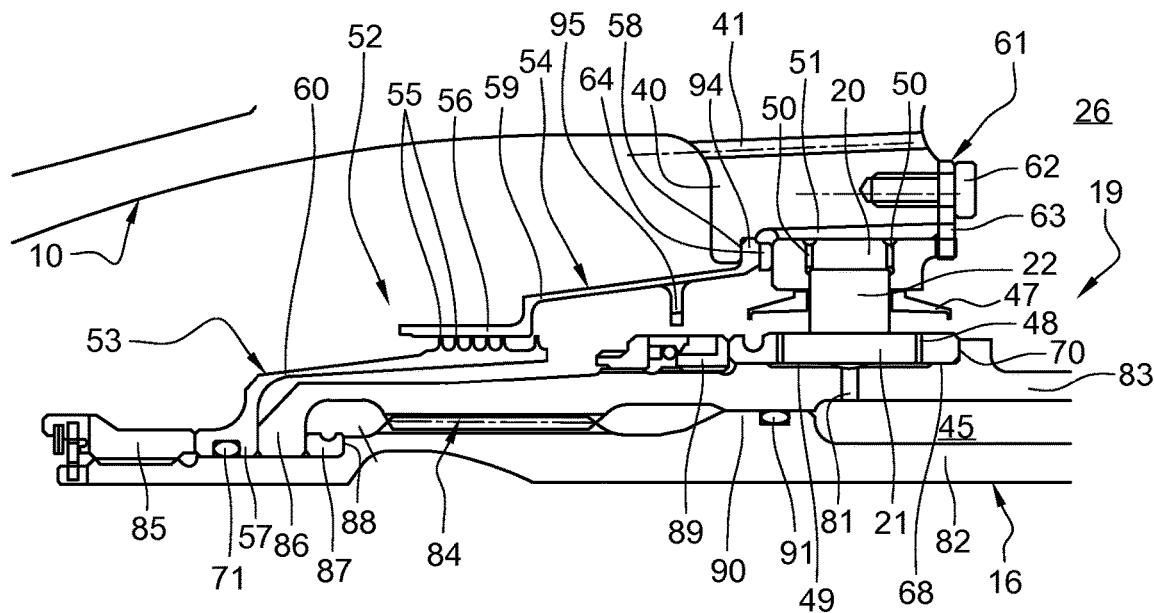
FIG. 8 is a detail view of FIGS. 6 and 7.

The fan shaft 10 is guided in rotation, preferably directly, with respect to the fixed structure 12 of the turbomachine 1 via a first bearing 17 and a second bearing 18 located axially upstream of the reducer 11. The input shaft 16 is guided in rotation with respect to the fan shaft 10 via a third rolling bearing 19 located axially upstream of the speed reducer 11. The third rolling bearing 19 comprises an outer ring 20 housed in the fan shaft 10, an inner ring 21 attached to the input shaft 16 and rolling elements 22 located between the inner and outer rings 20, 21 (FIGS. 4 and 8).

According to the embodiments illustrated in the FIGURES, the fan 2 comprises a disc on which the blades 15 are mounted. The disc is connected in rotation to the fan shaft 10.

The fan shaft 10 is guided in rotation via the first and second bearings 17, 18 with respect to an annular upstream support 23 attached to an internal hub 24 of an intermediate casing 25 of the fixed structure 12. The first and second bearings 17, 18 are housed in an annular lubrication enclosure 26 commonly referred to as an "oil enclosure". The first and second bearings 17, 18 are axially spaced from each other. The upstream support 23 is annular and comprises a base 27 and a fork 28 dividing the base 27 into an upstream branch 29 and a downstream branch 30.

The first bearing 17 is a rolling bearing (centred on the axis X) comprising an inner ring attached on the fan shaft 10 and an outer ring housed in the upstream branch 29 of the upstream support 23. The inner and outer rings define a rolling track for rolling elements (here cylindrical rollers). The first bearing 17 is thus able to support mainly radial loads.

The second bearing 18 is a rolling bearing (centred on the axis X) which is located axially downstream of the first bearing 17. The second bearing 18 comprises an inner ring 18a attached on the fan shaft 10 and an outer ring 18b housed in the downstream branch 30 of the upstream support 23. The inner ring 18a and outer ring 18b define a rolling track for rolling elements 18c (here balls). The balls 18c are in radial contact with the inner ring 18a and outer ring 18b. The second bearing 18 is thus able to support radial and axial loads.

The first and second bearings 17, 18 are each lubricated with a liquid lubricant such as oil via a nozzle.

The intermediate casing 25 comprises an inner hub 24 and an outer shell 31 extending around the hub 24, the inner hub 24 and the outer shell 31 being connected to each other by guide vanes 32 distributed evenly around the axis X. The outer shell 31 and the hub 24 form a portion of the secondary flowpath 14. The inner hub 24 comprises an annular passage defining a portion of the primary flowpath 13. The portion of the secondary flowpath 14 is separated radially from the portion of the primary flowpath 13 by an inter-flowpath compartment integrated into the structure 12, the compartment being, for example, intended for the passage of the auxiliaries.

According to the embodiments illustrated in the FIGURES, the reducer 11 is here of the epicyclic type. The reducer 11 is housed and lubricated in the lubrication enclosure 26. The reducer 11 is used to reduce the speed of the fan shaft 10 with respect to the speed of the LP turbine shaft 9. The input shaft 16 is rotationally coupled to a sun gear of the reducer 11 via first coupling means 33. The input shaft 16 is rotationally coupled to a shaft 34 of the annular low-pressure (LP) compressor 3 (fourth shaft) via second coupling means 35 disposed downstream of the reducer 11, whereby the LP compressor shaft 34 is rotationally coupled to the LP turbine shaft 9. The reducer 11 also comprises planet gears, each of which is disposed between the sun gear and a fixed ring gear in the case of an epicyclic reducer 11. The fan shaft 10 is connected in rotation to the planet carrier of the reducer 11, the planet carrier forming the output shaft of the reducer 11. Here, the ring gear is attached to the upstream support 23 via an annular sleeve 36.

The first coupling means 33 are coupling means with angular deflection. The first coupling means 33 are, for example, crowned teeth coupling means commonly known as to "crowned splines" comprising crowned teeth (i.e. the teeth comprising each a convexly curved profile in axial section) which are engaged in axial splines. The teeth are made either in the input shaft 16 or in the sun gear.

The second coupling means 35 comprise axial (or straight) splines made in the input shaft 16 and complementary axial splines made in the LP compressor shaft 34, the splines of the input shaft 16 being engaged in the splines of the LP compressor shaft 34.

The reducer 11 could be of the planetary type. In such a case, the planet carrier would be fixed and the ring gear would be rotationally linked to the fan shaft 10, each planet gear would have a fixed axis of rotation.

The LP compressor shaft 34 is guided in rotation via a fourth bearing 37 with respect to an annular downstream support 38 attached on the inner hub 24 of the intermediate casing 25. The fourth bearing 37 is housed in the enclosure 26. The fourth bearing 37 is a rolling bearing (centred on the axis X) which is axially located downstream of the reducer 11 and the elastically deformable means 39. The fourth bearing 37 (centred on the axis X) comprises an inner ring attached on the LP compressor shaft 34 and an outer ring housed in the downstream support 38. The inner and outer rings define a rolling track for rolling elements (here balls). The balls are in radial contact with the inner and outer rings. The fourth bearing 37 is thus able to support radial and axial loads. The fourth bearing 37 is lubricated with a liquid lubricant such as oil via a nozzle.

The lubrication enclosure 26 is more precisely delimited by fixed elements and moving elements. The fixed elements delimiting the enclosure 26 are the upstream support 23, the internal hub 24 and the downstream support 38. The mobile elements delimiting the enclosure 26 are the input shaft 16 and the fan shaft 10. Sealing means (not shown) are provided between the fixed and moving elements, the sealing means being for example one or more labyrinth seals and/or one or more brush seals and/or one or more segmented radial seals, etc. The sealing means are pressurized via an air circuit (not shown) in order to prevent lubricant leakages, e.g. the air is taken from the LP or HP compressor of the turbomachine 1. This air circuit is used to ventilate and pressurize the enclosure 26.

According to the embodiments illustrated in the FIGURES, the third rolling bearing 19 is housed in the enclosure 26, and is axially located downstream of the second bearing 18 and upstream of the reducer 11. Preferably, the outer diameter of the third bearing 19 is smaller than the inner diameter of the first and second bearings 17, 18 and the inner diameter of the fourth bearing 37. The third inter-shaft bearing 19 (centred on the axis X) comprises an inner ring 21 attached on the input shaft 16 and an outer ring 20 housed in a cylindrical housing formed in a collar 40 of the fan shaft 10. The inner and outer rings 21, 20 define a rolling track for rolling elements 22 (here cylindrical rollers 22). The third bearing 19 is thus able to support mainly radial loads. The collar 40 projects radially inwards. The collar 40 comprises axial holes 41 to catch any lubricant leakages.

Figure 3:
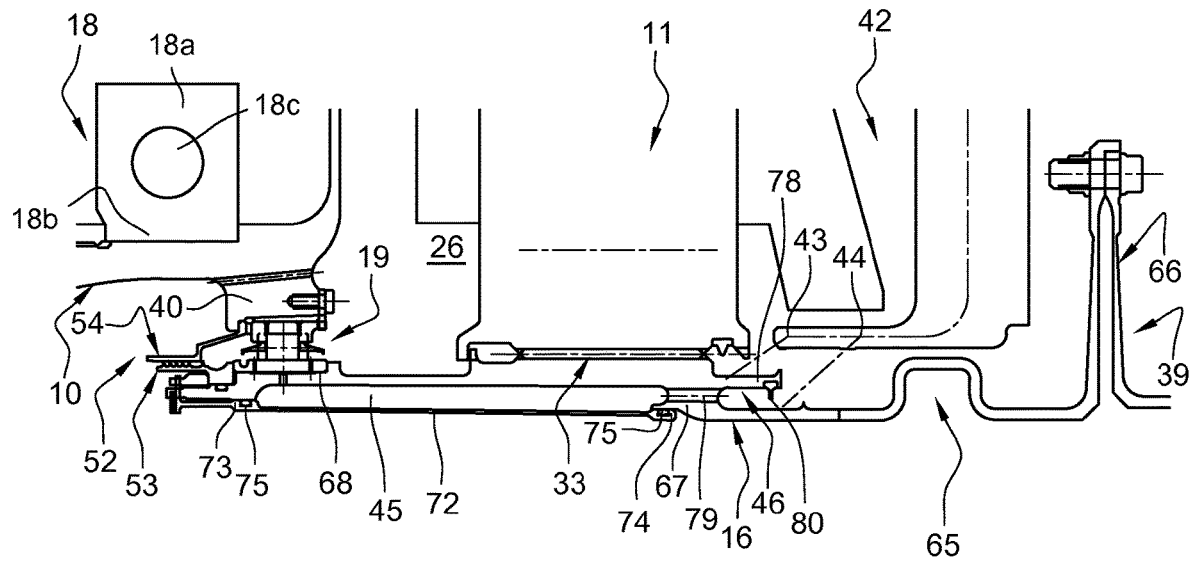
FIG. 3 is a detail axial half-section view of a concrete example of the first embodiment.
Figure 6:
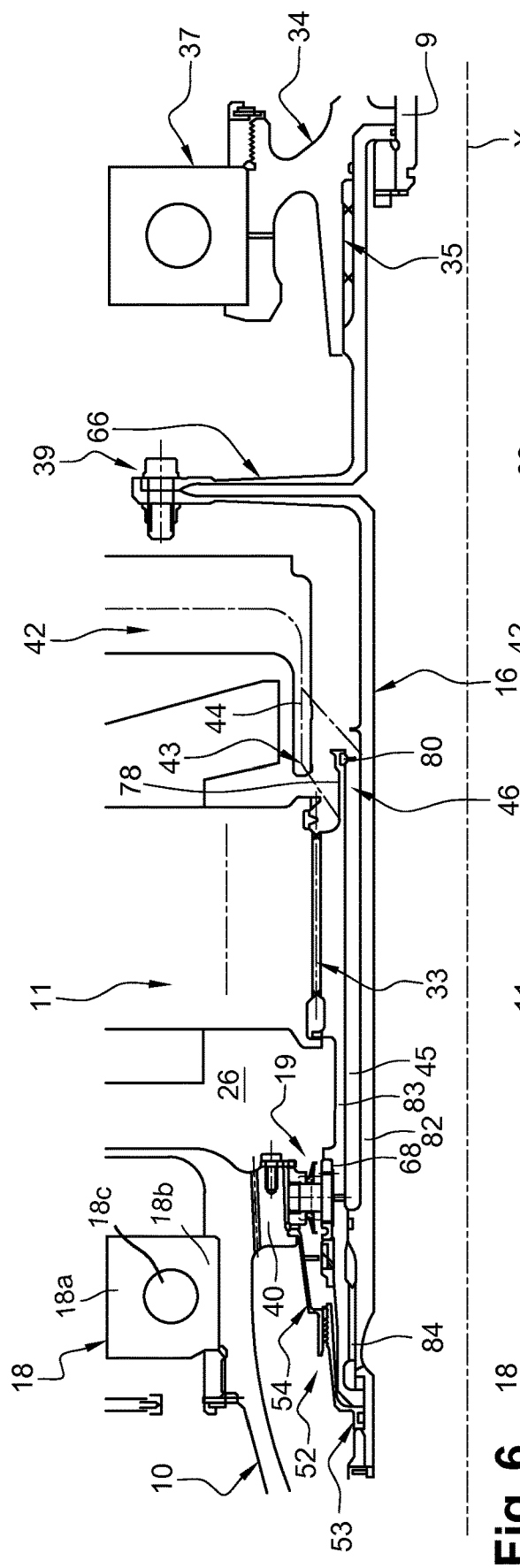
FIG. 6 is a detail axial half-section view of a first concrete example of the second embodiment.
Figure 7:
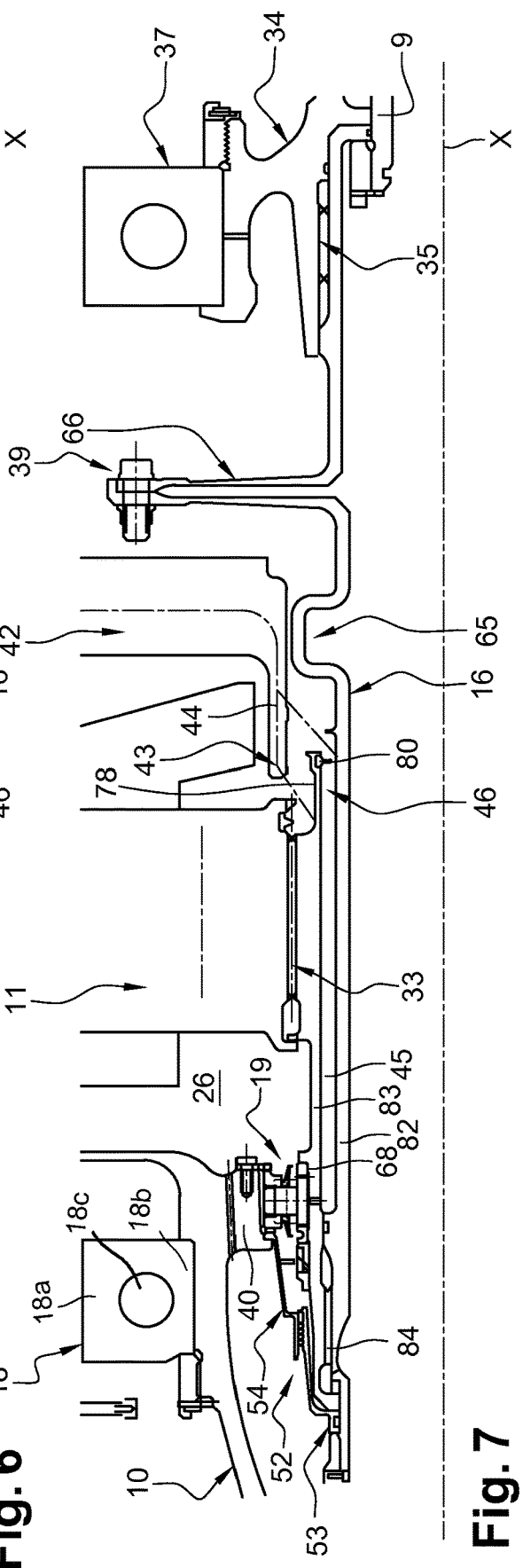
FIG. 7 is a detail axial half-section view of a second concrete example of the second embodiment.

As shown in FIGS. 3, 6 and 7, the turbomachine 1 comprises a nozzle 42 located downstream of the reducer 11, the nozzle 42 comprising an upstream outlet 43 for injecting liquid lubricant (such as oil) to lubricate the first coupling means 33. The nozzle 42 also comprises a downstream outlet 44 for injecting lubricant into an internal cavity 45 formed in the input shaft 16. The turbomachine 1 further comprises lubricant conveying means 46 configured to convey lubricant from the cavity 45 to the third bearing 19.

Figure 10:
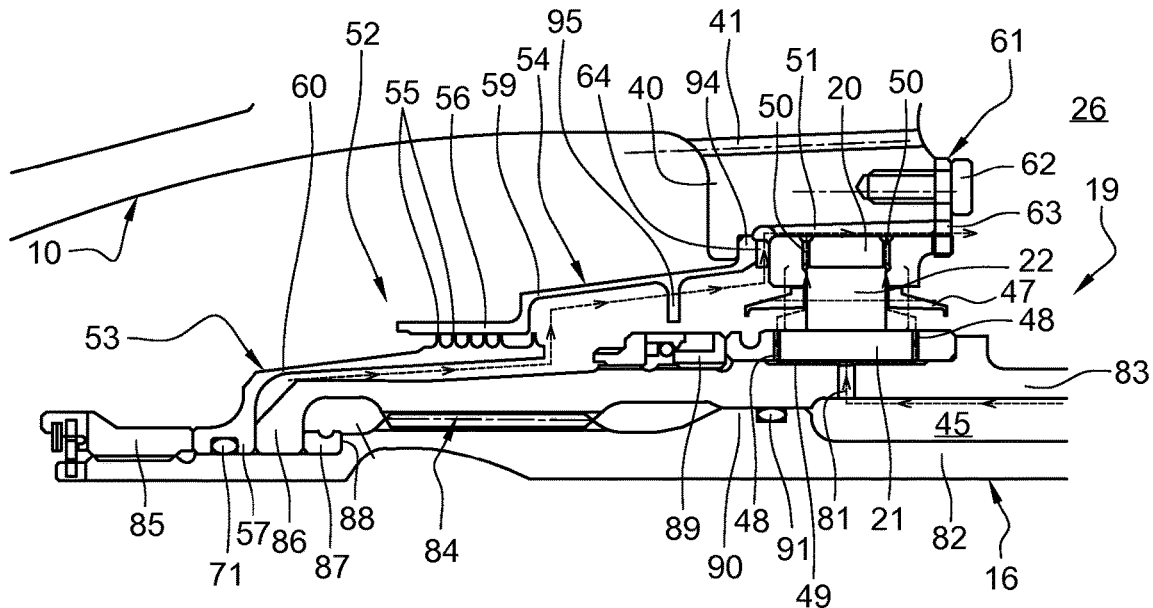
FIG. 10 corresponds to FIG. 8 showing the convey of the lubricant inside an annular enclosure of the turbomachine.

As shown in FIGS. 4, 8 and 10, the third bearing 19 comprises between the inner and outer rings 21, 20 deflectors 47 configured to guide the lubricant from the inner ring 21 through the rolling elements 22 to the outer ring 20.

The inner ring 21 comprises two annular rows, upstream and downstream respectively, of lubricant channels 48. These channels 48 are substantially radial, their radially outer ends opening into the rolling track of the inner ring 21 and their radially inner ends opening into axial notches 49 made in the input shaft 16, these axial notches 49 being distributed evenly around the axis X. The channels 48 and the notches 49 allow the lubricant to be conveyed from the annular cavity 45 formed in the input shaft 16 to the rolling track.

Similarly, the outer ring 20 comprises two annular rows, upstream and downstream respectively, of lubricant channels 50. These channels 50 are substantially radial, their radially inner ends opening into the rolling track and their radially outer ends opening into axial notches 51 made in the housing of the fan shaft 10, these axial notches 51 widening from upstream to downstream and being evenly distributed around the axis X. The channels 50 and the notches 51 allow the lubricant to be drained from the rolling track to an upstream end of the housing.

According to the embodiments illustrated in the FIGURES, the turbomachine 1 comprises sealing means 52 located upstream of the third bearing 19, these sealing means 52 being configured to provide inter-shaft sealing between the fan shaft 10 and the input shaft 16.

Specifically, the sealing means 52 comprise a first member 53 and a second member 54, the first member 53 comprising a plurality of annular lips 55 (five in this case) in radial contact with an abradable ring 56 of the second member 54. The lips 55 and the ring 56 thus form a labyrinth-type seal. The seal is pressurized via an air circuit (not shown) to prevent the lubricant leakage, the air being taken from the LP or HP compressor of the turbomachine 1, for example. This air circuit is used to ventilate and pressurize the enclosure 26. The first member 53 comprises a collar 57 attached to the input shaft 16. The second member 54 comprises a flange 94 located in the housing of the fan shaft 10 between the outer ring 20 of the third bearing 19 and an upstream shoulder 58 made in the housing (FIGS. 4 and 8). The ring 56 is connected to the flange 94 via an annular inclined wall 59. The lips 55 are connected to the collar 57 via an annular inclined web 60. The flange 94 of the second member 54 and the outer ring 20 of the third bearing 19 are stopped axially via an annular cap 61 which is detachably attached to the collar 40 of the fan shaft 10 via a plurality of screws 62 distributed evenly around the axis X. The cap 61 comprises several slots 63 radially in the area of the axial notches 51 so that the lubricant can be drained into the enclosure 26. A downstream face of the flange 94 of the second member 54 comprises radial notches 64 for the passage of the lubricant, these radial notches 64 communicating with the axial notches 51.

Having the sealing means 52 close to the third bearing 19 allows the necessary operating clearances to be minimized, and therefore the inter-shaft sealing and the pressurisation (or amount of air entering the enclosure 26) to be precisely controlled.

According to the embodiment illustrated in the FIGURES, the input shaft 16 comprises elastically deformable means 39 axially disposed downstream of the reducer 11, and more precisely between the reducer 11 and the second coupling means 35. The elastically deformable means 39 are, for example, one or more bellows 65 and/or one or more flexible coupling devices 66 known as flex coupling 66 and/or one or more jaw flexible coupling devices known as flex-curvic coupling devices.

The bellows 65 or the flex coupling devices 66 provide a local rotational flexibility about an axis transverse to the axis X of the turbomachine. When the bellows 65 or the flex coupling devices 66 are located in series with an axial spacing, the local points of rotational flexibility additionally create radial flexibility with respect to an axis transverse to the axis X of the turbomachine.

More precisely, a bellows 65 corresponds to an elastically extensible part, this part being generally pleated in an accordion-like manner.

A flex coupling device 66 is a device comprising two L-shaped shaft parts carrying flanges tightened against each other by means of screws which ensure the transmission of torque between the two shaft parts.

A flex-curvic coupling device is a flex coupling device 66 to which is added a jaw-coupling device at the flanges to transmit more torque. For example, the teeth are trapezoidal in shape.

It should be noted that the elastically deformable means 39 allow the reducer 11 to be isolated by separating the upstream and downstream portions of the input shaft 16 (via the integration of the elastically deformable means 39). The elastically deformable means 39 give flexibility to the input shaft 16, and in particular to the downstream portion of the input shaft 16 (and therefore to the second coupling means 35).

According to the embodiment illustrated in FIGS. 1 to 4, the input shaft 16 comprises an enlarged upstream portion axially delimited by a connection 67. The input shaft 16 comprises, in particular, from upstream to downstream, a bearing surface 68 intended to receive the inner ring 21 of the third bearing 19 (upstream portion) and the male or female element of the first coupling means 33 (upstream portion), the elastically deformable means 39 and the axial splines of the second coupling means 35.

According to the concrete example of the first embodiment illustrated in FIG. 3, the elastically deformable means 39 comprise an upstream bellows 65 and a downstream flex coupling device 66 located one after the other (or in series).

As shown in FIGS. 3 and 4, the collar 57 of the first member 53 is disposed axially between axial holding means 69 (here a nut 69) and the inner ring 21 of the third bearing 19, the inner ring 21 of the third bearing 19 being stopped axially by a downstream shoulder 70. The seal between the first member 53 and the input shaft 16 is provided by sealing means 71 located at the collar 57 (here an O-ring 71 housed in a circumferential annular groove made in the input shaft 16).

The internal cavity 45 is radially delimited by an internal surface of the upstream portion of the input shaft 16 and a sleeve 72 attached inside the upstream portion of the input shaft 16. The sleeve 72 comprises an upstream overthickness 73 and a downstream overthickness 74 in radial contact with the upstream portion of input shaft 16. The seal between the sleeve 72 and the input shaft 16 is ensured by sealing means 75 located at the upstream and downstream overthicknesss 73, 74 (here O-rings 75 housed in circumferential annular grooves made in the sleeve 72). In addition, the sleeve 72 comprises a throat 76 located upstream of the upstream and downstream overthicknesss 73, 74. The sleeve 72 is stopped axially with respect to the input shaft 16 by the connection 67 located downstream of the downstream overthickness 74 and an internal lock ring 77 located upstream of the throat 76.

The input shaft 16 comprises an axial bracket 78 projecting from upstream to downstream at the connection 67 forming a centrifugal scoop for recovering the lubricant injected by the downstream outlet 44 of the nozzle 42. The centrifugal scoop communicates with the internal cavity 45 via a plurality of axial holes 79 made in the connection 67 of the input shaft 16. The bracket 78 comprises a seal 80 at its downstream end with a flexible lip configured to maintain a sufficient level of lubricant. The input shaft 16 comprises an annular row of lubricant passage ducts 81 axially disposed at the inner ring 21 of the third bearing 19, these ducts 81 being evenly distributed around the axis X. These ducts 81 are substantially radial. Their radially inner ends open into the cavity 45 and their radially outer ends open at the axial notches 49. The upstream overthickness 73 is located upstream of the ducts 81.

Figure 9:
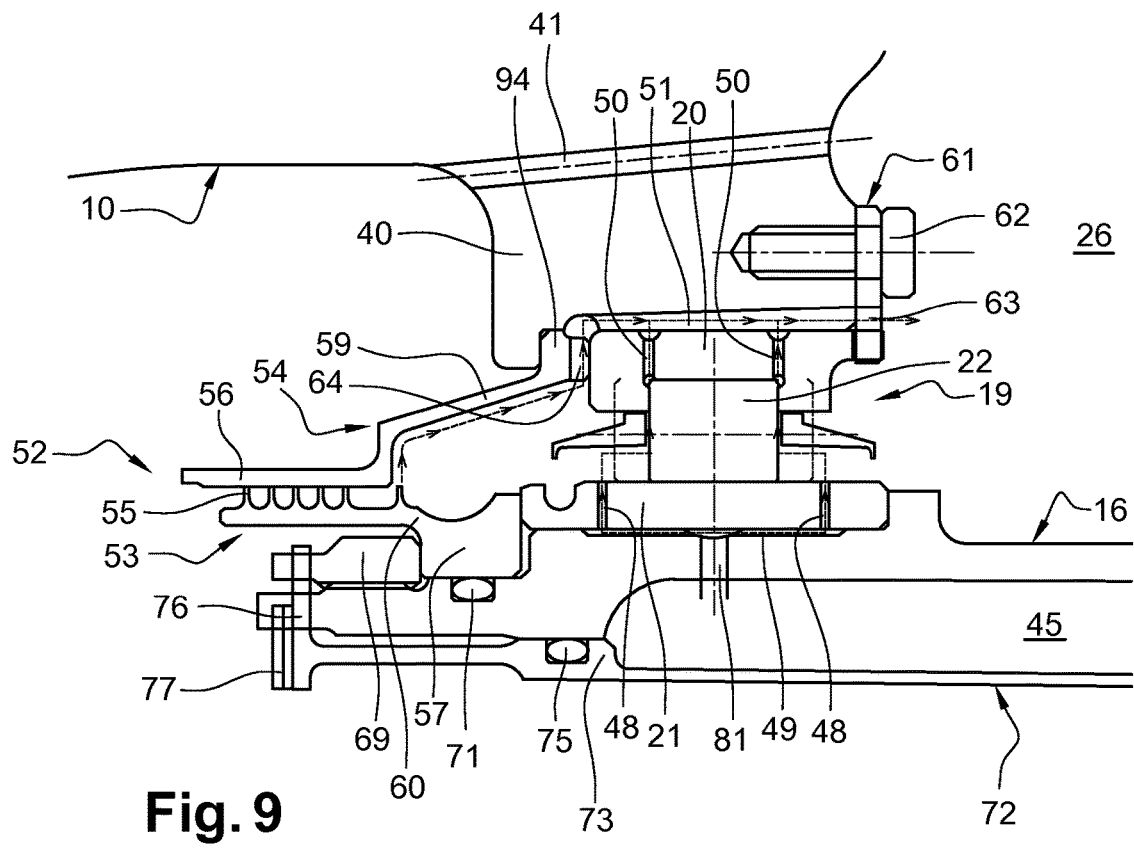
FIG. 9 corresponds to FIG. 4, which shows the convey of the lubricant inside an annular enclosure of the turbomachine.

As shown in FIGS. 3 and 9, under the centrifugal effect, the lubricant injected into the scoop is sprayed outwards, flowing from the scoop, axially from downstream to upstream and radially from the inside to the outside, to the rolling track of the third bearing 19. The lubricant flows at least successively through the scoop, the axial holes 79, the cavity 45 (more precisely on the inner surface of the upstream portion of the input shaft 16), the ducts 81, the axial notches 49, and the upstream and downstream channels 48.

The lips 55 of the first member 53 are disposed upstream of the collar 57.

Similarly, as shown in FIG. 9, under the centrifugal effect, the lubricant which is upstream of the third bearing 19 is sprayed outwards, the lubricant flowing from an upstream end of the wall 59 of the second member 54, axially from upstream to downstream and radially from the inside to the outside, to the slots 63 of the cap 61. The lubricant flows successively over (or into) the wall 59 of the second member 54, the radial notches 64, the axial notches 51, and the slots 63. Such an evacuation circuit prevents lubricant from being trapped (or stored) upstream of the third bearing 19 and creating imbalances which are detrimental to the dynamic equilibrium of the fan 2.

In the second embodiment shown in FIGS. 5 to 8, the input shaft 16 comprises an inner portion 82 and an outer portion 83 centred on the axis X. The inner portion 82 and the outer portion 83 are rotationally coupled to each other via third coupling means 84 located upstream of the third bearing 19 and the reducer 11. The outer portion 83 is rotationally coupled to the reducer 11 via the first coupling means 33. The inner ring 21 is attached on a bearing surface 68 of the outer portion 83. The inner portion 82 being rotationally coupled to the LP compressor shaft 34 via the second coupling means 35.

Having the third coupling means 84 upstream of the reducer 11 provides additional bending and rotational flexibility.

According to the first concrete example of the second embodiment illustrated in FIG. 6, the elastically deformable means 39 comprise a flex coupling device 66.

According to the second concrete example of the second embodiment shown in FIG. 7, the elastically deformable means 39 comprise an upstream bellows 65 and a downstream flex coupling device 66 located one after the other (or in series).

According to the second embodiment illustrated in FIGS. 5 to 8, the third coupling means 84 are, for example, axial splined-type toothed coupling means. The teeth are produced either in the inner portion 82 or in the outer portion 83.

Figure 14:
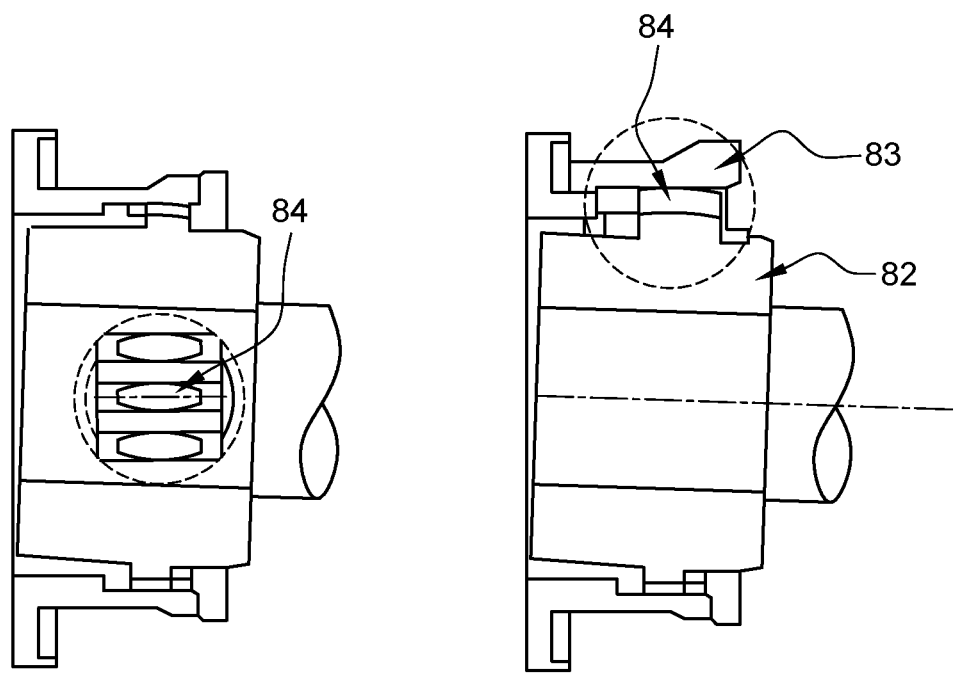
FIG. 14 shows coupling means between an inner portion and an outer portion of a shaft.

According to another embodiment shown in FIG. 14, the third coupling means 84 have an angular deflection. The third coupling means 84 are, for example, crowned teeth coupling means, commonly referred to as crowned splines, comprising crowned teeth (i.e. teeth with a convexly crowned profile in axial section) which are engaged in axial splines. Such crowned splines make it possible in particular to recover misalignment and reduce the stresses at each end of the splines.

The inner and outer portions 82, 83 of the input shaft 16 thus form a pin, in axial half-section. Such configuration ensures that the internal and external forces are taken up by the third bearing 19 before the transmission to the reducer 11.

The outer portion 83 comprises, in particular, from upstream to downstream, the male or female element of the third coupling means 84, a bearing surface 68 intended to receive the inner ring 21 of the third bearing 19 and the male or female element of the first coupling means 33. The inner portion 82 comprises, in particular, from upstream to downstream, the male or female element of the third coupling means 84, the elastically deformable means 39 and the axial splines of the second coupling means 35.

According to the concrete examples of the second embodiment shown in FIGS. 6 to 8, the collar 57 of the first member 53 is attached to the inner portion 82 of the input shaft 16. The collar 57 is disposed axially between axial holding means 85 (here a nut 85) and a ledge 86 of the outer portion 83 of the input shaft 16, the ledge 86 defining an upstream end of the outer portion 83 of the input shaft 16. The ledge 86 is located axially between the collar 57 and an annular strut 87 attached on the inner portion 82 of the input shaft 16. The strut 87 is disposed axially between the ledge 86 of the outer portion 83 of the input shaft 16 and a downstream shoulder 88 made in the inner portion 82 of the input shaft 16. Tightening the nut not only secures the first member 53 but also the outer portion 83 of the input shaft 16 with respect to the inner portion 82 of the input shaft 16. The seal between the first member 53 and the inner portion 82 of the input shaft 16 is achieved by sealing means 71 at the collar 57 (here an O-ring 71 housed in a circumferential annular groove made in the inner portion 82 of the input shaft 16).

The inner ring 21 of the third bearing 19 is stopped axially by axial holding means 89 (here a nut 89) upstream and a shoulder 70 downstream.

The inner cavity 45 is radially delimited by an inner surface of the outer portion 83 of the input shaft 16 and an outer surface of the inner portion 82 of the input shaft 16.

The outer portion 83 of the input shaft 16 comprises an axial bracket 78 projecting from upstream to downstream, downstream of the first coupling means 33, forming a centrifugal scoop for recovering the lubricant injected by the downstream outlet 44 of the nozzle 42. The centrifugal scoop communicates with the internal cavity 45. The bracket 78 comprises at its downstream end a seal 80 with a flexible lip configured to maintain a sufficient level of lubricant. The outer portion 83 of the input shaft 16 comprises an annular row of ducts 81 for lubricant passages disposed axially at the inner ring 21 of the third bearing 19, these ducts 81 being distributed evenly around the axis X. These ducts 81 are substantially radial. Their radially inner ends open into the cavity 45 and their radially outer ends open at the axial notches 49.

The inner portion 82 comprises a bead 90 located upstream of the ducts 81. The seal between the inner portion 82 and the outer portion 83 of the input shaft 16 is provided by sealing means 91 located at the bead 90 (here an O-ring 91 housed in a circumferential annular groove made in the inner portion 82 of the input shaft 16).

As shown in FIGS. 6, 7 and 10, under the centrifugal effect, the lubricant injected into the scoop is sprayed outwards, flowing from the scoop, axially from downstream to upstream and radially from the inside to the outside, to the rolling track of the third bearing 19. The lubricant flows at least successively into the scoop, the cavity 45 (more precisely on the inner surface of the outer portion 83 of the input shaft 16), the ducts 81, the axial notches 49, and the upstream and downstream channels 48.

The lips 55 of the first member 53 are disposed downstream of the collar 57. The wall 59 of the second member 54 comprises an inner partition with lubricant passage openings 95.

Similarly, as shown in FIG. 10, under the centrifugal effect, the lubricant present upstream of the third bearing 19 is sprayed outwards, the lubricant flowing from an upstream end of the web 60 of the first member 53, axially from upstream to downstream and radially from the inside to the outside, to the slots 63 of the cap 61. The lubricant flows successively over (or into) the web 60 of the first member 53, the wall 59 of the second member 54, the openings 95, the radial notches 64, the axial notches 51, and the slots 63. Such an evacuation circuit prevents lubricant from being trapped (or stored) upstream of the third bearing 19 and creating imbalances which are detrimental to the dynamic equilibrium of the fan 2.

Reference is now made to FIG. 11, which represents an assembly step in the assembly method of the turbomachine 1, and more specifically of the turbomachine 1 presented in the concrete example of the first embodiment.

During this assembly step, a first sub-assembly 92 (surrounded by dotted lines) is attached axially from upstream to downstream on a second sub-assembly 93.

The first sub-assembly 92 comprises in particular the fan shaft 10, the reducer 11, the second member 54, the outer ring 20 and the rolling elements 22 of the third bearing 19. The second sub-assembly 93 comprises in particular the input shaft 16, the first member 53 and the inner ring 21 of the third bearing 19.

FIG. 12 shows the same assembly step with reference to the concrete examples of the second embodiment.

Figure 13:
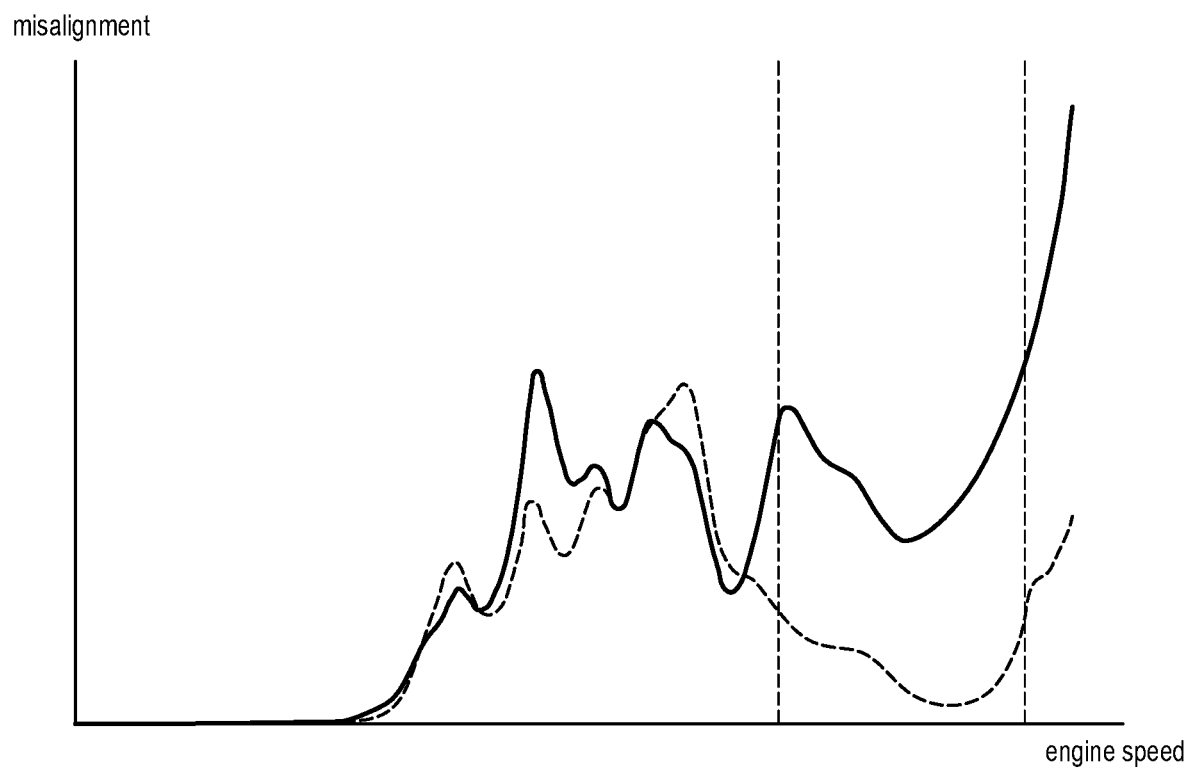
FIG. 13 is a graph showing the angular misalignment between the sun gear and a planet gear of the reducer as a function of the engine speed of the turbomachine.

FIG. 13 is a graph illustrating the angular misalignment between the sun gear and the planet gear of the reducer 11 (abscissa axis) as a function of the speed (or rotational speed) of the engine of the turbomachine 1 (and in other words the rotational speed of the LP turbine shaft 9) (ordinate axis). Typical values of misalignment amplitudes are between 0.1 and 0.01 degrees. The engine speed is expressed in revolutions per minute. The dashed curve represents an architecture of the prior art. The solid line curve represents an architecture according to the disclosure.

Compared to the prior art, there is a clear decrease in angular misalignment from an engine speed above 6000 rpm, which corresponds to the stabilized operating range of the engine (between the vertical dotted lines), i.e. between idle speed on the ground and maximum speed in flight. As an example, according to the disclosure, at 8000 rpm, the measured angular misalignment is reduced by a factor of more than 2 compared to the prior art.

Such a reduction in angular misalignment makes it possible, in particular, to reduce high-frequency vibrations, and consequently to increase the service life of the internal geared elements of the reducer 11.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A turbomachine with an axis of rotation, comprising: a single ducted fan comprising a first shaft carrying blades and driven in rotation by a second shaft via a speed reducer, said second shaft being driven in rotation by a third shaft of a turbine, said first, second and third shafts sharing the axis of rotation, said first shaft being guided in rotation with respect to a fixed structure of the turbomachine via a first bearing and a second bearing located upstream of said speed reducer, wherein the second shaft is guided in rotation with respect to the first shaft via a third rolling bearing located upstream of said speed reducer, said third rolling bearing comprising an outer ring housed in said first shaft, an inner ring attached to said second shaft, and rolling elements disposed between said inner and outer rings.

2. The turbomachine according to claim 1, further comprising sealing means located upstream of said third bearing and configured to ensure tightness between said first shaft and said second shaft.

3. The turbomachine according to claim 2, wherein said sealing means comprise a first member and a second member, said first member comprising at least one annular lip in radial contact with an abradable ring of said second member.

4. The turbomachine according to claim 3, wherein the first member comprises a collar attached to said second shaft, said collar being disposed axially between axial holding means and either said inner ring or a ledge made in said second shaft.

5. The turbomachine according to claim 3, wherein the second member comprises a flange located in a housing of said first shaft between said outer ring and a shoulder made in said housing.

6. The turbomachine according to claim 1, wherein said second shaft is rotationally coupled to said speed reducer via first coupling means, said second shaft being rotationally coupled to a fourth shaft of a compressor via second coupling means disposed downstream of said speed reducer, said fourth shaft being rotationally coupled to said third shaft.

7. The turbomachine according to claim 6, wherein said second shaft comprises an inner portion and an outer portion centred on the axis of rotation, the inner portion and the outer portion being rotationally coupled to each other via third coupling means disposed upstream of said third bearing, said outer portion being rotationally coupled to said speed reducer via the first coupling means, said inner ring being attached to said outer portion, said inner portion being rotationally coupled to the fourth shaft via the second coupling means.

8. The turbomachine according to claim 7, wherein said third coupling means have an angular deflection.

9. The turbomachine according to claim 1, wherein said second shaft comprises elastically deformable means axially disposed downstream of said speed reducer.

10. The turbomachine according to claim 9, wherein said elastically deformable means comprise a first elastically deformable device and a second elastically deformable device located in series.

11. The turbomachine according to claim 1, further comprising a nozzle disposed downstream of said speed reducer, said nozzle comprising an outlet for injecting a liquid lubricant into an internal cavity formed in said second shaft, the turbomachine further comprising conveying means of said lubricant configured to convey said lubricant from said cavity to the third bearing.

12. The turbomachine according to claim 1, wherein said first and second bearings each comprise an inner ring connected to said first shaft, an outer ring connected to said fixed structure of the turbomachine, and rolling elements between said inner and outer rings.

* * * * *